United States Patent [19]

Duval

[11] Patent Number: 4,464,200

[45] Date of Patent: Aug. 7, 1984

[54] PLASTIC SOIL STABILIZER COMPOSITION AND METHOD OF USE

[75] Inventor: Henry H. Duval, Dallas, Tex.

[73] Assignee: William B. Ellis, Dallas, Tex. ; a part interest

[21] Appl. No.: 380,618

[22] Filed: May 21, 1982

Related U.S. Application Data

[63] Continuation of Ser. No. 202,118, Oct. 30, 1980, abandoned, which is a continuation-in-part of Ser. No. 113,057, Jan. 17, 1980, abandoned.

[51] Int. Cl.$^3$ .............................................. C04B 7/02
[52] U.S. Cl. .................................... 106/90; 106/92; 106/97; 106/315; 106/900; 106/DIG. 1; 405/266; 405/271
[58] Field of Search ............ 106/90, 92, 97, 315, 106/DIG. 1, 900; 405/266, 271

[56] References Cited

U.S. PATENT DOCUMENTS

| | | | |
|---|---|---|---|
| 157,312 | 12/1874 | Colby et al. | 106/92 |
| 1,552,201 | 9/1925 | Bergsma | 106/92 |
| 2,311,290 | 2/1943 | Booth | 106/92 |
| 2,783,157 | 2/1957 | Grant et al. | 106/92 |
| 3,131,074 | 4/1964 | Thompson | 106/900 |
| 3,857,715 | 12/1974 | Humphrey | 106/92 |
| 4,036,301 | 7/1977 | Powers et al. | 106/315 |
| 4,052,220 | 10/1977 | Turpin | 106/92 |
| 4,129,449 | 12/1978 | Kosima | 106/95 |
| 4,205,993 | 6/1980 | Rosenberg et al. | 106/92 |

*Primary Examiner*—James Poer
*Attorney, Agent, or Firm*—Hubbard, Thurman, Turner & Tucker

[57] ABSTRACT

A composition and method of its use for stabilizing plastic soils which composition comprises from about 25 to about 85 weight percent portland cement, from about 0 to about 75 weight percent of a filter and from about 0.1 to about 5 weight percent of a retarding agent.

3 Claims, 2 Drawing Figures

PLASTIC SOIL STABILIZER COMPOSITION AND METHOD OF USE

CROSS REFERENCE TO RELATED APPLICATION

This is a continuation of application Ser. No. 202,118, filed Oct. 30, 1980, now abandoned, which is a continuation-in-part of my prior copending application Ser. No. 113,057 filed Jan. 17, 1980, now abandoned, for "Subgrade Soil Stabilizer Composition and Method of Use".

BACKGROUND OF THE INVENTION

One of the primary objects of the present invention is to alter the well known disadvantageous engineering characteristics of plastic clay soils and subgrade soils. The problems encountered in highly plastic soils and subgrade soils are well known to those skilled in the art.

It is also well known that hydrated lime as a common additive may be used to reduce the plasticity index and increase the load carrying capacity of clay soils.

However, quite often the chemical reaction of lime, when processed with water and mixed into the clay soil results in the lime forming calcium carbonate instead of the beneficial calcium hydroxide. This is caused by the inherent presence of carbon dioxide in the air which is supplied to the soil during the intimate mixing of the lime therewith. Also, the benefits of lime to improve the load bearing characteristics of plastic clays are substantially reduced if not completely eliminated, by the amount of lime reacting with the carbon dioxide to form calcium carbonate. Further, even if all the lime reacted to form the calcium hydroxide and thus reduce the plasticity index while increasing the load carrying capacity, such reaction is delayed over an undesirable period of time.

Also, it is well known that portland cement will also decrease the plasticity index and increase the load bearing characteristics thereof in about the same degree as lime as well as producing a rapid higher strength gain in a friable soil. However, since one to five days of "mellowing" time is required to make the plastic soil friable, most of the strength gained characteristics of cement are lost because of the delay required to reduce the plasticity index. For example, when the cement is mixed with the soil, the moisture present in the soil initiates hydration of the cement. On the other hand, as stated above the one to five day mellowing period, preferably about three days, is provided to allow the lime which is released from the portland cement to react with the soil thereby reducing its plasticity and making it friable. Then, after the plastic soil becomes friable, it is remixed and shaped to the desired grade and compacted.

It can be appreciated that such remixing to permit the intimate contact of the soil particles with the additive to enable bonding of the particles in order to increase the load carrying capacity when the mixture is compacted destroys the increased loading carrying capacity of the soil due to the cement during the mellowing period.

Also, it is known to employ 2 to 3 weight percent of hydrated lime to make a plastic soil friable, then 3 to 5 weight percent portland cement after the "mellowing" period to produce the desired increase in load carrying capacity. Although the end results are consistent because the portland cement does not lose its value by forming the useless calcium carbonate, as does the lime, the added cost of spreading the cement has made this method seldom used.

An object of the present invention is to enable a filler and portland cement to be mixed together and used as the additive to reduce the plasticity index of a plastic soil and provide a resulting strengthened soil matrix. To accomplish this, a suitable filler is employed with the portland cement mixture as well as a retarding agent to delay the action of the portland cement.

A still further object of the invention is to provide a composition including cement, a filler and retardant, with the cement or the retarder in a form to permit the clay soil to first become friable before hydration of the cement is initiated.

A still further object of the invention is to provide a composition including portland cement, a filler and retardant, with the cement in a form to permit the clay soil to first become friable before hydration of the cement is initiated.

A still further object of the invention is to provide a composition including portland cement, a filler and retardant, with the retarder in a form to permit the clay soil to first become friable before the hydration of the cement is initiated.

Yet another object of the present invention is to provide a composition including portland cement, a filler and pellets of retardant coated with different thicknesses of a water soluble coating which releases the retardant in a required dosage over a period of time to permit the clay soil to become friable.

Still another object of the present invention is to provide a composition and method of its use wherein the filler and portland cement mixture is provided with a retardant all in liquid form.

Yet another object of the invention is to provide a method of reducing the plasticity of a soil and provide the desired resulting strengthened soil matrix by adding a mixture to the soil of portland cement, a retarder, and a filler.

Other objects and advantages of the present invention will become more apparent from a consideration of the following drawing and description.

DESCRIPTION OF THE PREFERRED EMBODIMENT

Figure 1:
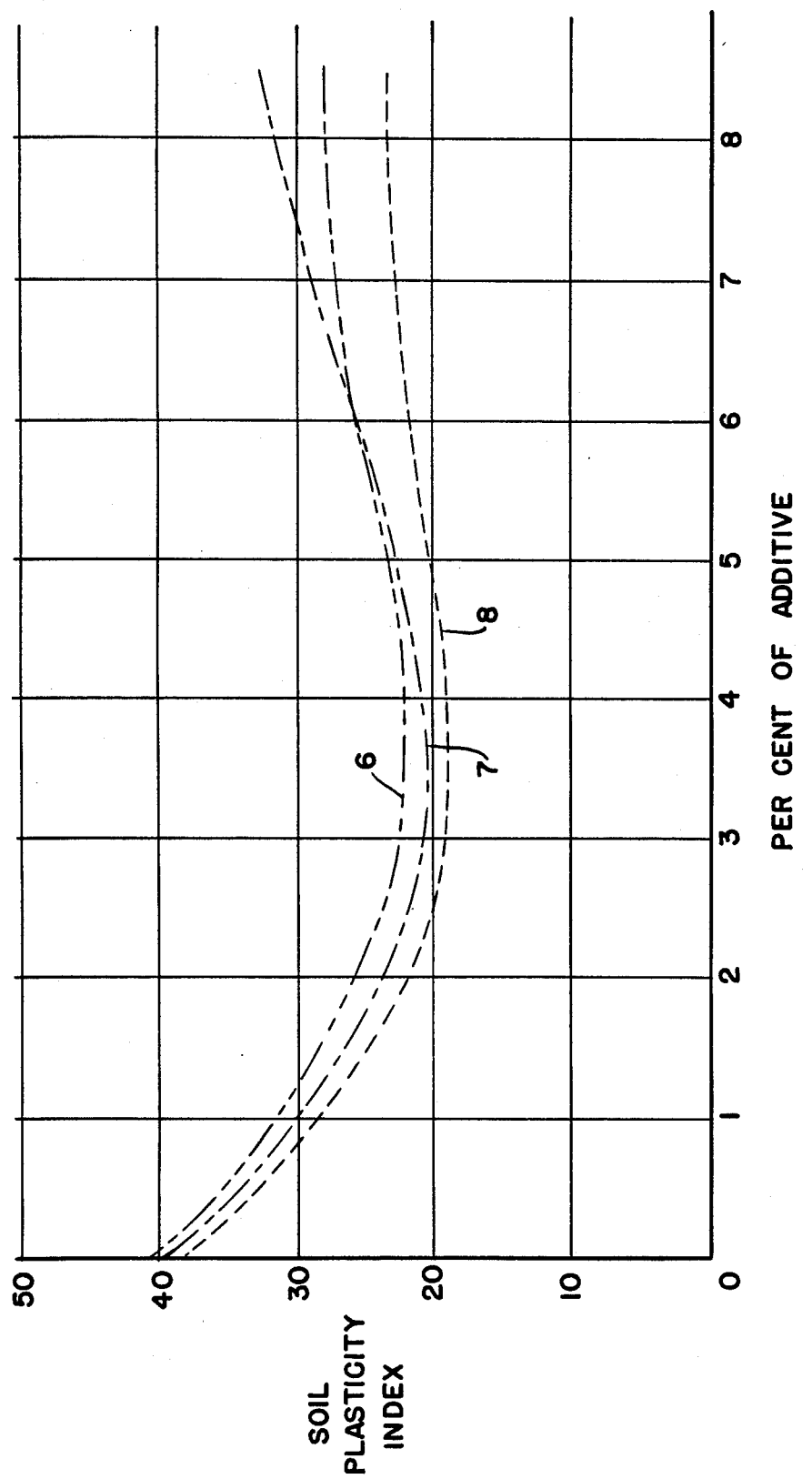
FIG. 1 is a group of graphs which diagrammatically illustrates, respectively, the effect of cement, lime and the stabilizer of the present invention in reducing the plasticity index of clay soil.

The stabilizer composition employed in the method of the present invention is about 25 to about 85 weight percent portland cement, about 0 to about 75 weight percent filler and about 0.1 to about 5 weight percent retarding agent.

Where the above composition is to be employed either in powder or liquid form as an additive to accomplish soil stabilization, the above ingredients in the ranges above set forth to accomplish the desired results may be utilized. The filler can be any suitable material such as flyash, cement plant stack dust, some types of clay or powdered slag and other similar materials.

The term "flyash" is well known and refers to the finely divided ash produced by the combustion of pulverized coal or lignite, which is carried off with the exhaust gases from the furnace in which the coal is burned. The flyash can be collected from these gases by means of any suitable apparatus such as an electrostatic precipitator. Finely pulverized ash resulting from the combustion of oil or other waste materials in an incinerator, or natural pozzolans can also be utilized within the scope of the present invention, providing their chemical compositions are reasonably similar to pulverized coal flyashes. The flyash should be in a finely divided state such that at least about 70 percent by weight will pass through a 200 mesh sieve, although incinerator ashes may be considerably coarser.

The term "plastic soils" as employed herein refers to natural, substantially inorganic material such as clay, loam, silt, or mixtures thereof which have a plasticity index of more than about 15. The "plasticity index" relates to the range of moisture content over which the soil is plastic, and is defined as the moisture content at the liquid limit minus the moisture content at the lower plastic limit in the soil. The liquid limit of the soil is that water content at which the soil passes from the plastic or semi-solid state to a liquid state. The plastic limit of the soil is the lowest water content at which it becomes plastic, or the content at which it changes from a solid to a semi-solid state.

Retarding agents such as lignites, glucose, or sugar can be used to accomplish the desired retarding of the hydration of the portland cement until after the lime present in the portland cement in the composition of the present invention reacts with the soil to reduce its plasticity index and make it friable. The retardation of the hydration of the portland cement until after the treated clay mixture is remixed and compacted enables a strengthening of the soil matrix to a substantially higher value than would be possible if no retardation of the cement had been effected.

Also, the use of the cement to accomplish the increase of strength in the soil matrix increases such strength to a much greater extent than would be possible if only lime were employed.

Thus, the preferred composition and method of the present invention is a mixture of portland cement, filler, and retarding agent in the percentages hereinabove provided, with one preferable composition being portland cement in an amount of about 50 weight percent, filler about 49.5 weight percent and retarder about 0.5 percent.

When this preferred composition is employed, the retardant would be provided with a water soluble coating of desired thickness so that the amount of retardant released in the mixture would be gradual and controlled over the "mellowing" time period needed to permit the free lime released from the portland cement to first act on the clay soil to first reduce its plasticity index and make it friable while inhibiting hydration of the portland cement. By the time this result is accomplished the retardant is dissipated and the soil and the additive is remixed to permit the intimate contact of the soil particles with the additive and the hydration of the cement then proceeds to bond the soil particles and increase the load carrying capacity of the soil when it is subsequently compacted.

From the foregoing it can be appreciated that the retarder, being in time release capsule form, gradually reacts with the portland cement to delay hydration thereof without interfering with the release of the free lime from the portland cement so that the free lime may react with the plastic soil to reduce its plasticity index and make it friable. After this has occurred, the retarding agent will have served its purpose and will be dissipated in about three to five days. Thereupon the soil and the portland cement are remixed and the hydration of the portland cement proceeds to strengthen the soil matrix to a degree that would not have been possible with the use of portland cement alone or with lime alone or with lime and portland cement.

The same beneficial result is accomplished when portland cement, filler and retarder within the ranges herein disclosed is employed in a liquid form. When the additive for the soil is in liquid form, the retardant must be present in a form in the mix water to immediately act and prevent the hydration of the cement.

However, the advantage of employing the retarder in the form of coated pellets with different thicknesses of a water soluble coating to provide a predetermined amount of retarder during the time that the plasticity index of the soil is being decreased and to make it friable is that lime may be eliminated as a separate constituent and the lime released from the portland cement employed to accomplish the reduction of the plastic index of the soil. This provides a substantial economic advantage.

FIG. 1 of the drawing graphically illustrates the reduction of the plasticity index of a soil with cement, lime or the stabilizer of the present invention. The effect on the plastic index of soil treated with cement is illustrated by the line 6. The effect on the plastic index of soil treated with lime is represented by the line 7, and the effect on the plastic index of soil treated with the stabilizer composition of the present invention is represented by the line 8.

Figure 2:
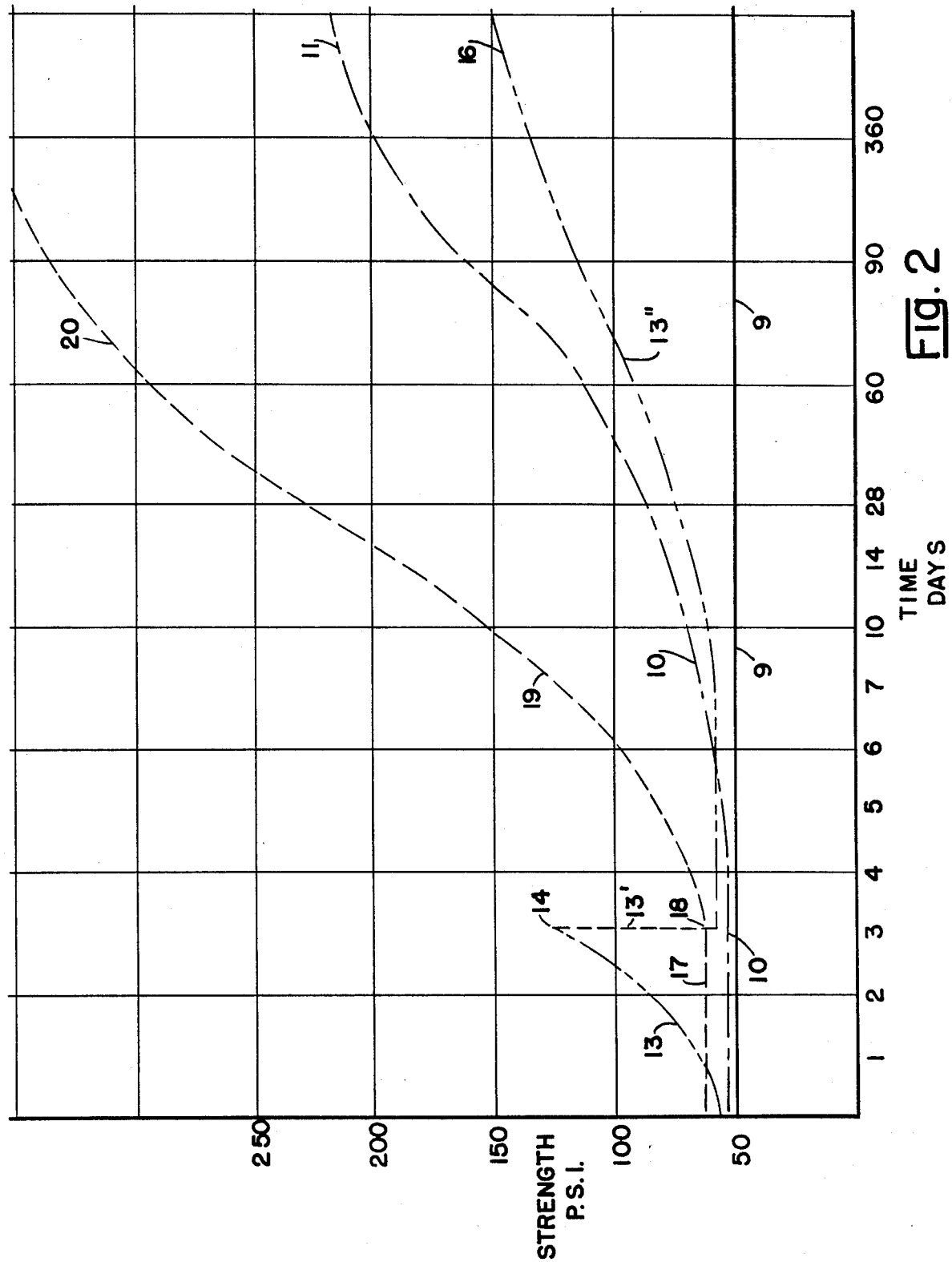
FIG. 2 is a group of graphs to diagrammatically illustrate, respectively, the relative strength imparted to soil matrix by treating the soil with portland cement without a retardant and by treating soil with lime as compared with the benefits of treating soil in the manner of the present invention with a stabilizer composition comprising portland cement, a retardant and a filler as the additive to first reduce the plasticity index of a soil to render it friable and then increase the strength of the soil matrix in accordance with the present invention.

FIG. 2 of the drawing is a graph with "time in days" represented on the Y axis and "strength" of the soil in "pounds per square inch" represented on the vertical or X axis. Raw clay, or untreated soil is represented by the line 9. It can be seen that there is no increase in soil strength of raw clay over any time period. Soil which is stabilized with lime is diagrammatically represented by the line indicated at 10 which begins at the vertical X axis and continues until the resultant maximum strength of the stabilized soil is as illustrated at the portion 11 of the line 10.

The line 13 in the graph illustrates the strength gain effect on the soil when only portland cement is employed. It is to be noted that a part of the line 13 is illustrated in dotted form at 13'. The reason for this is that at the end of approximately three days as represented by the point 14 on the line 13, the soil is again remixed which destroys any strength in the soil matrix and the hydration of the cement then reinitiates and the resulting strength or stabilizing effect from the use of cement alone or cement and filler is then represented by the line 13" with the maximum resulting strength indicated by the portion 16 on such line.

When a soil stabilizing composition of the present invention such as cement with a retarder and filler is employed the line represented at 17 indicates that during the first three days there is no appreciable increase in the load bearing qualities of the soil due to the fact that hydration of the portland cement is prevented while not interfering with the release of the free lime from the portland cement so that the plasticity index of the soil may be decreased and the soil made friable. At the end of approximately the three day interval, the soil is remixed as represented by the point 18 on line 17, and at such time hydration of the portland cement is initiated with resultant increase in the soil matrix strength and an increase in its load bearing characteristics as represented by the line 19 from the point 18. It will be noted that a greater load bearing characteristic is imparted to the soil by the stabilizer of the present invention, than that which results from the use of cement, or cement and filler, lime or lime and filler as diagrammatically illustrated by the portion 20 of line 19.

Since lime, when used alone to stabilize plastic soil reacts with available carbon dioxide in the air to form calcium carbonate during the so-called mellowing period during which the plasticity index of the soils is decreased and the soil is made friable for remixing, shaping and compaction, the desirability of using lime to accomplish such result is substantially reduced.

However, the present invention overcomes this difficulty in that cement is utilized, to provide the source of lime to reduce the plasticity index of the soil and make it friable. However, hydration of the cement is delayed or retarded during the period that the lime released from the cement to reduce the plasticity index of the soils and to make the soil friable so that the soil may be remixed, shaped and compacted in any desired manner without substantially affecting the soil matrix strength. Thereafter, hydration of the cement then occurs due to the presence of moisture in the soil so that the soil matrix strength may be increased substantially over and above that possible either with lime alone, or with cement and lime compositions where no retarder is employed, as illustrated in the graph of the drawing.

The free lime released from the portland cement is not detrimentally affected by the presence of carbon dioxide during the mellowing period of the soil when the decrease of the plasticity index of the soil occurs and the soil is made friable.

Until the present invention, the use of portland cement as a plasticizer for plastic soils has generally been rejected due to the fact that the portland cement hydrates rapidly and ordinarily begins to harden when it is mixed with the soil. Thus, such hardening proceeds during the one to five day mellowing period in which the lime released from the portland cement also acts to reduce the plasticity index of the soil and make it friable. At the termination of the mellowing period, the soil is remixed thus completely destroying any strength that has come about in the soil matrix as a result of the hardening of the cement during the mellowing period. This is represented by the dotted line 13' between the portions 13 and 13" on the line representing soil treated with cement, or cement and filler.

The cement then, in effect starts at zero strength again but it does not build up the load bearing characteristics of the plasticized soil to that which it would be otherwise capable if hydration of the cement were delayed, or retarded as in the present invention.

Delay or retarding the hydration of the cement may be effected in any suitable manner. For example, the cement, or the retarding agent employed, or both could be coated by water soluble means such as gelatin or starch or other suitable well known materials of varying thickness so that the cement particles and retarder agent could be selectively contacted over a period of time. Also the retarding agent, such as sugar, could be provided in hard pellets so that it would be released to the stabilizer composition of the present invention over an extended, or selected period of time.

For example, if the retarder is provided in coated pellet or pill form, the coating would be such that it would dissolve at a rate so the retarder would be continually present and exposed to the cement particles during the period that the plastic index of the soil is being reduced by the free lime in the cement which period of time as previously noted is about three days. At that time, the retarder, or its action would have been dissipated so that hydration of the cement would begin and continue to increase the soil strength.

Since the retarder functions to delay the hydration of the portland cement until after the plasticity index of the plastic soil has been decreased and the soil made friable, the soil may then be pulverized, graded and compacted in any desired manner. Thereafter the portland cement begins to hydrate to bind the compacted soil mixture into a hardened, stable mass.

Another advantage of the present invention composition is that since free lime is not a component of the mixture except when released by the portland cement portion, formation of calcium carbonate is minimized, if not negated, and the available lime is more fully effective in reducing plasticity of the soil. Secondly, the soil stabilizer composition of the present invention is intended to compete with the present use of lime in reducing soil plasticity, and, without a free lime component, will be available when lime is unavailable. Also, by reducing the number of components, the mixing operations required by the present invention are simplified. Also, the composition of the present invention imparts a higher strength to the soil than the stabilizer with the lime component and thus is more effective.

While this invention has been described in relation to its preferred embodiments, it is to be understood that various modifications thereof will be apparent to those of ordinary skill in the art upon reading the specification and it is intended to cover all such modifications as fall within the scope of the appended claims.

What is claimed is:

1. A method of stabilizing plastic soils comprising the steps of:
   mixing with the plastic soil a composition comprising about 50 weight percent Portland cement, about 49.5 percent weight filler and about 0.5 weight percent retarding agent;
   maintaining the plastic soil and composition undisturbed for a period sufficient to permit the lime in the composition to react with the plastic soil to reduce the plasticity index of the plastic soil;
   remixing the plastic soil with the composition therein and shaping it to the desired grade; and
   curing the remixed plastic soil and composition into a hardened, stable mass.

2. The method of claim 1 wherein the retarding agent in the composition is one or more of the group consisting of sugar, lignates and glucose.

3. The method of claim 1 wherein the filler in the composition is one of the group consisting of flyash, cement plant stack dust and powdered slag.

* * * * *

UNITED STATES PATENT AND TRADEMARK OFFICE
CERTIFICATE OF CORRECTION

PATENT NO. : 4,464,200
DATED     : August 7, 1984
INVENTOR(S) : Henry H. Duval

It is certified that error appears in the above-identified patent and that said Letters Patent is hereby corrected as shown below:

In the Abstract of the Disclosure, line 4, "filter" should be --filler--.

Signed and Sealed this

Twenty-fifth Day of December 1984

[SEAL]

Attest:

GERALD J. MOSSINGHOFF

Attesting Officer

Commissioner of Patents and Trademarks